US011892800B2

(12) United States Patent
Fujihara et al.

(10) Patent No.: US 11,892,800 B2
(45) Date of Patent: *Feb. 6, 2024

(54) METHOD FOR PRODUCING TONER FOR ELECTROSTATIC CHARGE IMAGE DEVELOPMENT, TONER FOR ELECTROSTATIC CHARGE IMAGE DEVELOPMENT, AND ELECTROSTATIC CHARGE IMAGE DEVELOPER

(71) Applicant: FUJIFILM Business Innovation Corp., Tokyo (JP)

(72) Inventors: Yoshimasa Fujihara, Kanagawa (JP); Daisuke Noguchi, Kanagawa (JP); Kazuhiko Nakamura, Kanagawa (JP); Hiroshi Nakazawa, Kanagawa (JP); Yuji Isshiki, Kanagawa (JP)

(73) Assignee: FUJIFILM Business Innovation Corp., Tokyo (JP)

(*) Notice: Subject to any disclaimer, the term of this patent is extended or adjusted under 35 U.S.C. 154(b) by 69 days.

This patent is subject to a terminal disclaimer.

(21) Appl. No.: 17/398,138

(22) Filed: Aug. 10, 2021

(65) Prior Publication Data

US 2022/0299894 A1 Sep. 22, 2022

(30) Foreign Application Priority Data

Mar. 19, 2021 (JP) ................................. 2021-046474

(51) Int. Cl.
*G03G 9/08* (2006.01)

(52) U.S. Cl.
CPC ......... *G03G 9/0804* (2013.01); *G03G 9/0815* (2013.01)

(58) Field of Classification Search
None
See application file for complete search history.

(56) References Cited

FOREIGN PATENT DOCUMENTS

| | | | | | |
|---|---|---|---|---|---|
| JP | 2011008244 | A | * | 1/2011 | ........... G03G 9/0804 |
| JP | 2011-102855 | A | | 5/2011 | |
| JP | 2013-109341 | A | | 6/2013 | |
| JP | 2019028158 | A | * | 2/2019 | |
| JP | 2019-111462 | A | | 7/2019 | |

OTHER PUBLICATIONS

JP-2019028158-A Translation (Year: 2023).*
JP-2011008244-A Translation (Year: 2023).*

* cited by examiner

*Primary Examiner* — Peter L Vajda
*Assistant Examiner* — Charles Collins Sullivan, IV
(74) *Attorney, Agent, or Firm* — Sughrue Mion, PLLC

(57) ABSTRACT

A method for producing a toner for electrostatic charge image development includes: aggregating binder resin particles in a dispersion containing the binder resin particles to form aggregated particles; terminating growth of the aggregated particles by adding an alkaline aqueous solution to a dispersion containing the aggregated particles to increase a pH of the dispersion containing the aggregated particles; and fusing and coalescing the aggregated particles into toner particles by heating the dispersion containing the aggregated particles. Terminating the growth of the aggregated particles includes, while stirring the dispersion containing the aggregated particles, stepwise or continuously reducing a stirring power per unit volume.

17 Claims, No Drawings

METHOD FOR PRODUCING TONER FOR ELECTROSTATIC CHARGE IMAGE DEVELOPMENT, TONER FOR ELECTROSTATIC CHARGE IMAGE DEVELOPMENT, AND ELECTROSTATIC CHARGE IMAGE DEVELOPER

CROSS-REFERENCE TO RELATED APPLICATIONS

This application is based on and claims priority under 35 USC 119 from Japanese Patent Application No. 2021-046474 filed Mar. 19, 2021.

BACKGROUND

(i) Technical Field

The present disclosure relates to a method for producing a toner for electrostatic charge image development, a toner for electrostatic charge image development, and an electrostatic charge image developer.

(ii) Related Art

Japanese Unexamined Patent Application Publication No. 2011-102855 discloses a method for producing an electrophotographic toner including a step of adding a predetermined amount of aggregating agent to a dispersion of resin particles to form a dispersion containing the resin particles and the aggregating agent, a step of aggregating the resin particles in the dispersion containing the resin particles and the aggregating agent to form a dispersion containing aggregated particles, and a step of coalescing the aggregated particles.

Japanese Unexamined Patent Application Publication No. 2013-109341 discloses a toner production method including a mixing step of mixing an aqueous dispersion of resin particles containing a resin having an acidic polar group with an aqueous dispersion of colorant particles containing a colorant to form a dispersion mixture containing the resin particles and the colorant particles; an aggregation step of aggregating the resin particles and the colorant particles by adding an aggregating agent containing divalent or higher valent metal ions to the dispersion mixture to form aggregated particles; and a fusion step of adding a chelator to the dispersion of the aggregated particles formed in the aggregation step, then adding a water-soluble monovalent metal salt, heating the dispersion to the glass transition point of the resin or higher to fuse the resin particles and the colorant particles in the aggregated particles.

Japanese Unexamined Patent Application Publication No. 2019-111462 discloses a method for producing aggregated particles including a step of mixing an aqueous dispersion of resin particles and an aggregating agent under stirring to grow aggregated particles until the volume median particle size reaches a desired value, and a step of increasing the stirring power per unit mass when the volume median particle size of the aggregated particles reaches a desired value.

SUMMARY

Aspects of non-limiting embodiments of the present disclosure relate to a method for producing a toner for electrostatic charge image development. This method reduces generation of fine toner compared with the case in which the stirring power per unit volume is constant in the aggregation termination step.

Aspects of certain non-limiting embodiments of the present disclosure address the above advantages and/or other advantages not described above. However, aspects of the non-limiting embodiments are not required to address the advantages described above, and aspects of the non-limiting embodiments of the present disclosure may not address advantages described above.

According to an aspect of the present disclosure, there is provided a method for producing a toner for electrostatic charge image development, the method including: aggregating binder resin particles in a dispersion containing the binder resin particles to form aggregated particles; terminating growth of the aggregated particles by adding an alkaline aqueous solution to a dispersion containing the aggregated particles to increase a pH of the dispersion containing the aggregated particles; and fusing and coalescing the aggregated particles into toner particles by heating the dispersion containing the aggregated particles, wherein terminating the growth of the aggregated particles includes, while stirring the dispersion containing the aggregated particles, stepwise or continuously reducing a stirring power per unit volume.

DETAILED DESCRIPTION

Exemplary embodiments of the present disclosure will be described below. The following description and Examples are for illustrating the exemplary embodiments, but are not intended to limit the scope of the exemplary embodiments.

The numerical ranges expressed by using "to" in the present disclosure indicate ranges inclusive of the numerical values before and after "to" as the minimum value and the maximum value.

In numerical ranges described stepwise in the present disclosure, the upper limit or the lower limit of one numerical range may be replaced by the upper limit or the lower limit of another numerical range. The upper limit or lower limit of any numerical range described in the present disclosure may be replaced by a value described in Examples.

In the present disclosure, the term "step" includes not only an independent step but also a step that cannot be clearly distinguished from other steps but may accomplish an intended purpose.

In the present disclosure, each component may contain two or more corresponding substances. In the present disclosure, the amount of each component in a composition refers to, when there are two or more substances corresponding to each component in the composition, the total amount of the substances present in the composition, unless otherwise specified.

In the present disclosure, each component may contain two or more types of particles corresponding to each component. The particle size of each component refers to, when there are two or more types of particles corresponding to each component in the composition, the particle size of a mixture of the types of particles present in the composition, unless otherwise specified.

In the present disclosure, the "(meth)acrylic" refers to at least one of acrylic and methacrylic, and the "(meth)acrylate" refers to at least one of acrylate and methacrylate.

In the present disclosure, the "toner" refers to a "toner for electrostatic charge image development", the "developer"

refers to an "electrostatic charge image developer, and the "carrier" refers to a "carrier for electrostatic charge image development".

In the present disclosure, a method for producing toner particles by aggregating and coalescing material particles in a solvent is called the emulsion aggregation (EA) method.

Method for Producing Toner for Electrostatic Charge Image Development

A toner production method according to an exemplary embodiment includes producing toner particles by the EA method and includes an aggregation step, an aggregation termination step, and a coalescence step as described below.

Aggregation step: a step of aggregating binder resin particles in a dispersion containing the binder resin particles to form aggregated particles Aggregation termination step: a step of terminating growth of the aggregated particles by adding an alkaline aqueous solution to the dispersion containing the aggregated particles to increase the pH of the dispersion containing the aggregated particles Coalescence Step: A Step of Fusing and Coalescing the Aggregated Particles into Toner Particles by Heating the Dispersion Containing the Aggregated Particles In the toner production method according to the exemplary embodiment, the aggregation termination step includes, while stirring the dispersion containing the aggregated particles, stepwise or continuously reducing the stirring power per unit volume. Stepwise or continuous reduction of the stirring power per unit volume may reduce generation of fine toner. The mechanism for this is assumed as described below.

Increasing the pH of the dispersion containing the aggregated particles by addition of an alkaline aqueous solution to the dispersion containing the aggregated particles may tend to reduce the cohesion of the aggregated particles. If the shearing force of stirring acting on the aggregated particles is too high in this case, the aggregated particles may break up into fine toner particles as a result. Reducing the stirring power per unit volume during addition of the alkaline aqueous solution to the dispersion containing the aggregated particles may suppress break-up of the aggregated particles and, as a result, may prevent or reduce production of fine toner particles.

In the aggregation termination step, the number of steps in stepwise reduction of the stirring power per unit volume may be one, two, three, four, or five, preferably two, three, or four.

To suppress assembly of the aggregated particles to prevent generation of coarse toner particles, the stirring power per unit volume in the aggregation termination step is preferably not less than 0.1 $kW/m^3$, more preferably not less than 0.14 $kW/m^3$, still more preferably not less than 0.18 $kW/m^3$.

To suppress break-up of the aggregated particles to prevent generation of fine toner particles, the stirring power per unit volume in the aggregation termination step is preferably not more than 3.5 $kW/m^3$, more preferably not more than 3.4 $kW/m^3$, still more preferably not more than 3.3 $kW/m^3$.

The stirring power per unit volume ($kW/m^3$) may be controlled by changing the rotation speed of a stirring unit according to the viscosity of the dispersion containing the aggregated particles and the size of a stirring unit.

The details of the steps and the materials in the toner production method according to the exemplary embodiment will be described below. Aggregation Step (First Aggregation Step)

The aggregation step involves aggregating at least binder resin particles in a dispersion containing at least the binder resin particles to form aggregated particles.

The dispersion to be subjected to the aggregation step may contain at least either release agent particles or colorant particles. The aggregation step may thus involve aggregating at least either release agent particles or colorant particles together with the binder resin particles.

When the toner production method according to the exemplary embodiment includes a second aggregation step (a step for forming a shell layer) described below, the above aggregation step is referred to as a "first aggregation step"). The first aggregation step involves forming a core in a toner having a core-shell structure.

The dispersion to be subjected to the aggregation step is produced by, for example, preparing a resin particle dispersion containing binder resin particles, a release agent particle dispersion containing release agent particles, and a colorant particle dispersion containing colorant particles, and mixing these particle dispersions. These particle dispersions may be mixed in any order.

The common features of the resin particle dispersion, the release agent particle dispersion, and the colorant particle dispersion will be described below by collectively referring these particle dispersions to as a "particle dispersion".

An exemplary embodiment of the particle dispersion is a dispersion prepared by dispersing a material in the form of particles in a dispersion medium by using a surfactant.

The dispersion medium for the particle dispersion may be an aqueous medium. Examples of the aqueous medium include water and alcohols. Water may be water with a low ion content, such as distilled water or ion exchange water. These aqueous media may be used alone or in combination of two or more.

The surfactant used to disperse the material in the dispersion medium may be an anionic surfactant, a cationic surfactant, or a nonionic surfactant. Examples of the surfactant include anionic surfactants, such as sulfate salts, sulfonate salts, phosphate salts, and soaps; cationic surfactants, such as amine salts and quaternary ammonium salts; and nonionic surfactants, such as polyethylene glycols, alkylphenol ethylene oxide adducts, and polyhydric alcohols. The surfactant may be used alone or in combination of two or more. A nonionic surfactant may be used in combination with an anionic surfactant or a cationic surfactant.

Examples of the method for dispersing the material in the form of particles in the dispersion medium include known dispersion methods using a rotary shear homogenizer, a ball mill having media, and a sand mill, and Dyno-Mill.

Examples of the method for dispersing the resin in the form of particles in the dispersion medium include phase-inversion emulsion. The phase-inversion emulsification is a method for dispersing a resin in the form of particles in an aqueous medium. This method involves dissolving a resin in a hydrophobic organic solvent capable of dissolving the resin; adding a base to the organic continuous phase (O phase) to cause neutralization; and then adding an aqueous medium (W phase) to cause phase inversion from W/O to O/W.

The volume average particle size of the particles dispersed in the particle dispersion is preferably 30 nm or more and 300 nm or less, more preferably 50 nm or more and 250 nm or less, still more preferably 80 nm or more and 200 nm or less.

The volume average particle size of the particles in the particle dispersion refers to the particle size at 50% cumulative volume from the smaller particle size in the particle size distribution measured with a laser diffraction-type particle size distribution analyzer (e.g., LA-700 available from Horiba Ltd.).

The amount of the particles contained in the particle dispersion is preferably 5 mass % or more and 50 mass % or less, more preferably 10 mass % or more and 40 mass % or less, still more preferably 15 mass % or more and 30 mass % or less.

Binder Resin

Examples of the binder resin include vinyl resins composed of a homopolymer of a monomer or a copolymer of two or more monomers selected from, for example, styrenes (e.g., styrene, p-chlorostyrene, α-methylstyrene), (meth) acrylic acid esters (e.g., methyl acrylate, ethyl acrylate, n-propyl acrylate, n-butyl acrylate, lauryl acrylate, 2-ethylhexyl acrylate, methyl methacrylate, ethyl methacrylate, n-propyl methacrylate, lauryl methacrylate, 2-ethylhexyl methacrylate), ethylenically unsaturated nitriles (e.g., acrylonitrile, methacrylonitrile), vinyl ethers (e.g., vinyl methyl ether, vinyl isobutyl ether), vinyl ketones (e.g., vinyl methyl ketone, vinyl ethyl ketone, vinyl isopropenyl ketone), and olefins (e.g., ethylene, propylene, butadiene).

Examples of the binder resin further include non-vinyl resins, such as epoxy resins, polyester resins, polyurethane resins, polyamide resins, cellulose resins, polyether resins, and modified rosins; and mixtures of these non-vinyl resins and the above vinyl resins, and graft polymers produced by polymerization of a vinyl monomer in the presence of these non-vinyl resins.

These binder resins may be used alone or in combination of two or more.

The binder resin may be a polyester resin. Examples of the polyester resin include amorphous polyester resins and crystalline polyester resins.

The term "crystalline" for polyester resins in the exemplary embodiment means that polyester resins show a distinct endothermic peak rather than stepwise endothermic changes as measured by differential scanning calorimetry (DSC) and specifically means that the half width of the endothermic peak measured at a heating rate of 10° C./min is within 10° C.

The term "amorphous" for polyester resins in the exemplary embodiment means that polyester resins show a half width of more than 10° C., show stepwise endothermic changes, or show no distinct endothermic peak.

Amorphous Polyester Resin

An amorphous polyester resin may be a commercial product or a synthetic product.

Examples of the amorphous polyester resin include a polycondensation polymer of a polycarboxylic acid and a polyhydric alcohol.

Examples of the polycarboxylic acid, which is a polymer component of the amorphous polyester resin, include aliphatic dicarboxylic acids (e.g., oxalic acid, malonic acid, maleic acid, fumaric acid, citraconic acid, itaconic acid, glutaconic acid, succinic acid, alkenyl succinic acid, adipic acid, and sebacic acid), alicyclic dicarboxylic acids (e.g., cyclohexanedicarboxylic acid), aromatic dicarboxylic acids (e.g., terephthalic acid, isophthalic acid, phthalic acid, naphthalene dicarboxylic acid), anhydrides thereof, and lower (e.g., C1 to C5) alkyl esters thereof. Of these, the polycarboxylic acid may be an aromatic dicarboxylic acid.

The polycarboxylic acid may be a combination of a dicarboxylic acid and a trivalent or higher valent carboxylic acid having a crosslinked structure or branched structure. Examples of the trivalent or higher valent carboxylic acid include trimellitic acid, pyromellitic acid, anhydrides thereof, and lower (e.g., C1 to C5) alkyl esters thereof.

The polycarboxylic acid may be used alone or in combination of two or more.

Examples of the polyhydric alcohol, which is a polymer component of the amorphous polyester resin, include aliphatic diols (e.g., ethylene glycol, diethylene glycol, triethylene glycol, propylene glycol, butanediol, hexanediol, and neopentyl glycol), alicyclic diols (e.g., cyclohexanediol, cyclohexane dimethanol, hydrogenated bisphenol A), and aromatic diols (e.g., an ethylene oxide adduct of bisphenol A, and a propylene oxide adduct of bisphenol A). Of these, the polyhydric alcohol is preferably, for example, an aromatic diol or an alicyclic diol, and more preferably an aromatic diol.

The polyhydric alcohol, which is a polymer component of the amorphous polyester resin, may be a combination of a diol and a trihydric or higher polyhydric alcohol having a crosslinked structure or branched structure. Examples of the trihydric or higher polyhydric alcohol include glycerol, trimethylolpropane, and pentaerythritol.

The polyhydric alcohol may be used alone or in combination of two or more.

The glass transition temperature (Tg) of the amorphous polyester resin is preferably 50° C. or higher and 80° C. or lower, and more preferably 50° C. or higher and 65° C. or lower.

The glass transition temperature is determined from the DSC curve obtained by differential scanning calorimetry (DSC) and, more specifically, determined in accordance with "extrapolated glass transition onset temperature" described in the method for determining the glass transition temperature in JIS K 7121-1987 "Testing Methods for Transition Temperatures of Plastics".

The weight-average molecular weight (Mw) of the amorphous polyester resin is preferably 5,000 or more and 1,000,000 or less, and more preferably 7,000 or more and 500,000 or less.

The number-average molecular weight (Mn) of the amorphous polyester resin is preferably 2,000 or more and 100,000 or less.

The molecular weight distribution Mw/Mn of the amorphous polyester resin is preferably 1.5 or more and 100 or less, and more preferably 2 or more and 60 or less.

The weight-average molecular weight and the number-average molecular weight are determined by gel permeation chromatography (GPC). The determination of the molecular weight by GPC is carried out by using a GPC HLC-8120GPC available from Tosoh Corporation as a measuring system, a column TSKgel SuperHM-M (15 cm) available from Tosoh Corporation, and a THF solvent. The weight-average molecular weight and the number-average molecular weight are calculated from the molecular weight calibration curve created on the basis of the obtained measurement results using a monodisperse polystyrene standard.

The amorphous polyester resin is produced by using a known production method. Specifically, the amorphous polyester resin is produced by using, for example, a method involving causing reaction at a polymerization temperature of 180° C. or higher and 230° C. or lower in a reaction system, as necessary, under reduced pressure while removing water and alcohol generated during condensation.

If the monomers serving as materials are neither dissolved in nor compatible with each other at the reaction temperature, a solvent with a high boiling point may be added as a solubilizer to form a solution. In this case, the polycondensation reaction is carried out while the solubilizer is distilled off. If a monomer with poor compatibility is present in the copolymerization reaction, the monomer with poor compatibility is previously subjected to condensation with an acid or alcohol that is to undergo polycondensation with the monomer, and the condensate is then subjected to polycondensation with a main component.

Crystalline Polyester Resin

A crystalline polyester resin may be a commercial product or a synthetic product.

Examples of the crystalline polyester resin include a polycondensate of a polycarboxylic acid and a polyhydric alcohol. The crystalline polyester resin may be a polycondensate produced by using a straight-chain aliphatic polymerizable monomer rather than a polymerizable monomer having an aromatic ring in order to easily form the crystal structure.

Examples of the polycarboxylic acid, which is a polymer component of the crystalline polyester resin, include aliphatic dicarboxylic acids (e.g., oxalic acid, succinic acid, glutaric acid, adipic acid, suberic acid, azelaic acid, sebacic acid, 1,9-nonanedicarboxylic acid, 1,10-decanedicarboxylic acid, 1,12-dodecanedicarboxylic acid, 1,14-tetradecanedicarboxylic acid, and 1,18-octadecanedicarboxylic acid), aromatic dicarboxylic acids (e.g., dibasic acids, such as phthalic acid, isophthalic acid, terephthalic acid, and naphthalene-2,6-dicarboxylic acid), anhydrides thereof, and lower (e.g., 1 or more and 5 or less carbon atoms) alkyl esters thereof.

The polycarboxylic acid may be a combination of a dicarboxylic acid and a trivalent or higher valent carboxylic acid having a crosslinked structure or branched structure. Examples of the trivalent carboxylic acid include aromatic carboxylic acids (e.g., 1,2,3-benzenetricarboxylic acid, 1,2,4-benzenetricarboxylic acid, and 1,2,4-naphthalenetricarboxylic acid), anhydrides thereof, and lower (e.g., 1 or more and 5 or less carbon atoms) alkyl esters thereof.

The polycarboxylic acid may be a combination of these dicarboxylic acids and a dicarboxylic acid having a sulfonic acid group or a dicarboxylic acid having an ethylenic double bond.

The polycarboxylic acid may be used alone or in combination of two or more.

Release Agent

Examples of the release agent include hydrocarbon waxes; natural waxes, such as carnauba wax, rice wax, and candelilla wax; synthetic or mineral and petroleum waxes, such as montan wax; and ester waxes, such as waxes of fatty acid esters and montanic acid esters. The release agent is not limited to these.

The melting temperature of the release agent is preferably 50° C. or higher and 110° C. or lower, and more preferably 60° C. or higher and 100° C. or lower.

The melting temperature of the release agent is determined from the DSC curve obtained by differential scanning calorimetry (DSC) in accordance with "melting peak temperature" described in the method for determining the melting temperature in JIS K 7121:1987 "Testing Methods for Transition Temperatures of Plastics".

Colorant

Examples of the colorant include pigments, such as carbon black, chrome yellow, hansa yellow, benzidine yellow, threne yellow, quinoline yellow, pigment yellow, permanent orange GTR, pyrazolone orange, vulcan orange, watchung red, permanent red, brilliant carmine 3B, brilliant carmine 6B, DuPont oil red, pyrazolone red, lithol red, rhodamine B lake, lake red C, pigment red, rose bengal, aniline blue, ultramarine blue, calco oil blue, methylene blue chloride, phthalocyanine blue, pigment blue, phthalocyanine green, malachite green oxalate; and dyes, such as acridine dyes, xanthene dyes, azo dyes, benzoquinone dyes, azine dyes, anthraquinone dyes, thioindigo dyes, dioxazine dyes, thiazine dyes, azomethine dyes, indigo dyes, phthalocyanine dyes, aniline black dyes, polymethine dyes, triphenylmethane dyes, diphenylmethane dyes, and thiazole dyes. The colorant may be used alone or in combination of two or more.

The colorant may be a surface-treated colorant as necessary and may be used in combination with a dispersant.

A dispersion formed by mixing two or more particle dispersions is referred to as a "dispersion mixture".

After mixing two or more particle dispersions, the pH of the dispersion mixture may be adjusted in the range of 3 to 4. Examples of the method for adjusting the pH of the dispersion mixture include addition of an aqueous solution of nitric acid, an aqueous solution of hydrochloric acid, or an aqueous solution of sulfuric acid, which is an acidic aqueous solution.

The mass ratio of the particles contained in the dispersion mixture may be in the following range.

When the dispersion mixture contains the release agent particles, the mass ratio of the binder resin particles to the release agent particles (binder resin particles:release agent particles) is preferably from 100:3 to 100:30, more preferably from 100:5 to 100:25, still more preferably from 100:8 to 100:20.

When the dispersion mixture contains the colorant particles, the mass ratio of the binder resin particles to the colorant particles (binder resin particles:colorant particles) is preferably from 100:5 to 100:35, more preferably from 100:7 to 100:30, still more preferably from 100:9 to 100:25.

The aggregation step includes: for example, adding an aggregating agent to the dispersion mixture while stirring the dispersion mixture; and, after adding the aggregating agent to the dispersion mixture, increasing the temperature of the dispersion mixture by heating the dispersion mixture while stirring the dispersion mixture.

Examples of the aggregating agent include surfactants having polarity opposite to the polarity of the surfactant contained in the dispersion mixture, inorganic metal salts, and divalent or higher valent metal complexes. The aggregating agent may be used alone or in combination of two or more.

Examples of inorganic metal salts include metal salts, such as calcium chloride, calcium nitrate, barium chloride, magnesium chloride, zinc chloride, aluminum chloride, and aluminum sulfate; and inorganic metal salt polymers, such as polyaluminum chloride, polyaluminum hydroxide, and calcium polysulfide.

The aggregating agent is preferably a divalent or higher valent metal salt compound, more preferably a trivalent metal salt compound, still more preferably a trivalent inorganic aluminum salt compound. Examples of trivalent inorganic aluminum salt compounds include aluminum chloride, aluminum sulfate, polyaluminum chloride, and polyaluminum hydroxide.

The amount of the aggregating agent added is not limited. When a trivalent metal salt compound is used as an aggregating agent, the amount of the trivalent metal salt compound added relative to 100 parts by mass of the binder resin is preferably 0.1 parts by mass or more and 2.5 parts by mass or less, more preferably 0.15 parts by mass or more and 2.0 parts by mass or less, still more preferably 0.2 parts by mass or more and 1.5 parts by mass or less.

The temperature that the dispersion mixture reaches in heating the dispersion mixture may be, for example, (Tg—30° C.) or higher and (Tg—10° C.) or lower, where Tg is the glass transition temperature of the binder resin particles.

When the dispersion mixture contains two or more types of binder resin particles having different Tgs, the lowest Tg among the Tgs is defined as a Tg in the aggregation step.

Second Aggregation Step

The second aggregation step is provided for the purpose of producing a toner having a core-shell structure and provided after the first aggregation step. The second aggregation step is for forming the shell layer.

The second aggregation step involves: mixing a dispersion containing the aggregated particles and a dispersion containing shell layer-forming resin particles that will form a shell layer; and aggregating the shell layer-forming resin particles on the surfaces of the aggregated particles to form second aggregated particles.

The dispersion containing the shell layer-forming resin particles is preferably at least one selected from binder resin particle dispersions for forming the core, more preferably a polyester resin particle dispersion.

The second aggregation step includes: for example, adding the dispersion containing the shell layer-forming resin particles to the dispersion containing aggregated particles while stirring the dispersion containing the aggregated particles; and after adding the dispersion containing the shell layer-forming resin particles, heating the dispersion containing the aggregated particles under stirring.

The temperature that the dispersion containing the aggregated particles reaches in heating the dispersion containing the aggregated particles may be, for example, (Tg—30° C.) or higher and (Tg—10° C.) or lower, where Tg is the glass transition temperature of the shell layer-forming resin particles.

Aggregation Termination Step

The aggregation termination step is provided for the purpose of terminating the growth of the aggregated particles or the second aggregated particles after the aggregated particles or the second aggregated particles grow to a predetermined size before heating in the coalescence step. The following exemplary embodiment is common to the dispersion containing the aggregated particles and the dispersion containing the second aggregated particles.

The aggregation termination step involves adding an alkaline aqueous solution to the dispersion containing the aggregated particles to increase the pH of the dispersion containing the aggregated particles.

The alkaline aqueous solution may be at least one selected from the group consisting of aqueous solutions of alkali metal hydroxides, aqueous solutions of alkaline earth metal hydroxides, and aqueous solutions of chelators for chelating the aggregating agent.

Examples of aqueous solutions of alkali metal hydroxides and aqueous solutions of alkaline earth metal hydroxides include an aqueous solution of sodium hydroxide, an aqueous solution of potassium hydroxide, an aqueous solution of calcium hydroxide, and an aqueous solution of barium hydroxide, with an aqueous solution of sodium hydroxide being preferred.

The chelator is a chemical substance that chelates the aggregating agent used in the aggregation step. Examples of the chelator include oxycarboxylic acids, such as tartaric acid, citric acid, and gluconic acid; and aminocarboxylic acids, such as iminodiacetic acid (IDA), nitrilotriacetic acid (NTA), and ethylenediaminetetraacetic acid (EDTA).

In the aggregation termination step, a chelator separate from the alkaline aqueous solution may be added to the dispersion containing the aggregated particles in order to terminate the growth of the aggregated particles.

The total amount of the chelator added relative to 100 parts by mass of the binder resin particles is preferably 0.01 parts by mass or more and 5.0 parts by mass or less and more preferably 0.1 parts by mass or more and less than 3.0 parts by mass.

To maintain aggregation of the aggregated particles and suppress break-up of the aggregated particles when adding the alkaline aqueous solution to increase the pH of the dispersion containing the aggregated particles in the aggregation termination step, the pH of the dispersion containing the aggregated particles may be not higher than 9.

In the toner production method according to the exemplary embodiment, the aggregation termination step includes, while stirring the dispersion containing the aggregated particles, stepwise or continuously reducing the stirring power per unit volume.

The number of steps in stepwise reduction of the stirring power per unit volume may be one, two, three, four, or five, preferably two, three, or four.

To prevent broadening of the particle size distribution of the aggregated particles, the stirring power per unit volume in the aggregation termination step is preferably in the range of 0.1 $kW/m^3$ or more and 3.5 $kW/m^3$ or less, more preferably in the range of 0.14 $kW/m^3$ or more and 3.4 $kW/m^3$ or less, still more preferably in the range of 0.18 $kW/m^3$ or more and 3.3 $kW/m^3$ or less.

In the aggregation termination step, the stirring power per unit volume may be reduced stepwise as the pH of the dispersion containing the aggregated particles increases stepwise. In other words, the stirring power per unit volume may be reduced stepwise in conjunction with stepwise increasing pH of the dispersion containing the aggregated particles by addition of the alkaline aqueous solution. Specifically, the reduction of the stirring power per unit volume after addition of the alkaline aqueous solution may be performed multiple times (e.g., twice, three times, four times, five times).

Coalescence Step

The coalescence step involves fusing and coalescing the aggregated particles into toner particles by heating the dispersion containing the aggregated particles.

When the second aggregation step is provided before the coalescence step, the coalescence step involves fusing and coalescing the second aggregated particles into toner particles by heating the dispersion containing the second aggregated particles. The toner particles having a core-shell structure can be produced through the second aggregation step and the coalescence step.

The following exemplary embodiment is common to the aggregated particles and the second aggregated particles.

The temperature that the dispersion containing the aggregated particles reaches is preferably higher than or equal to the glass transition temperature (Tg) of the binder resin, specifically preferably a temperature higher than the Tg of the binder resin by 10° C. to 30° C.

When the aggregated particles contain two or more binder resins having different Tgs, the highest Tg among the Tgs is defined as a glass transition temperature in the coalescence step.

After completion of the coalescence step, the toner particles in the dispersion are subjected to a known washing step, a known solid-liquid separation step, and a known drying step to produce dry toner particles. The washing step may involve sufficient displacement washing with ion exchange water in view of charging characteristics. The solid-liquid separation step may involve, for example, suction filtration or pressure filtration in view of productivity. The drying step may involve, for example, freeze drying, flush drying, fluidized bed drying, or vibratory fluidized bed drying in view of productivity.

Step of Externally Adding External Additives

The toner production method according to the exemplary embodiment may include a step of externally adding external additives to the toner particles.

The external addition of external additives to the toner particles is carried out by mixing the dry toner particles and the external additives. Mixing may be performed with a V-blender, a Henschel mixer, a Lodige mixer, or other mixers. In addition, coarse toner particles may be removed with a vibratory screening machine, a wind-power screening machine, or other machines, as necessary.

Examples of external additives include inorganic particles. Examples of the inorganic particles include $SiO_2$, $TiO_2$, $Al_2O_3$, CuO, ZnO, $SnO_2$, $CeO_2$, $Fe_2O_3$, MgO, BaO, CaO, $K_2O$, $Na_2O$, $ZrO_2$, $CaO.SiO_2$, $K_2O.(TiO_2)_n$, $Al_2O_3.2SiO_2$, $CaCO_3$, $MgCO_3$, $BaSO_4$,and $MgSO_4$.

The surfaces of the inorganic particles serving as an external additive may be hydrophobized. The hydrophobization treatment is performed by, for example, immersing the inorganic particles in a hydrophobizing agent. Examples of the hydrophobizing agent include, but are not limited to, a silane coupling agent, a silicone oil, a titanate coupling agent, and an aluminum coupling agent. These hydrophobizing agents may be used alone or in combination of two or more.

The amount of the hydrophobizing agent relative to 100 parts by mass of the inorganic particles is normally, for example, 1 part by mass or more and 10 parts by mass or less.

Examples of external additives also include resin particles (resin particles made of, for example, polystyrene, polymethyl methacrylate, and melamine resin), and cleaning active agents (e.g., higher fatty acid metal salts, such as zinc stearate, fluorocarbon polymer particles).

The amount of external additives externally added relative to the mass of the toner particles is preferably 0.01 mass % or more and 5 mass % or less, and more preferably 0.01 mass % or more and 2.0 mass % or less. Toner The toner produced by the production method according to the exemplary embodiment may be toner with the external additives on the toner particles. The forms of the external additives are as described above.

The toner produced by the production method according to the exemplary embodiment may be a toner having a single-layer structure, or may be a toner having a core-shell structure having a core part (core) and a coating layer (shell layer) covering the core part. The toner having a core-shell structure has: for example, a core part containing a binder resin, a release agent, and a colorant; and a coating layer containing a binder resin.

The amount of the binder resin relative to the entire toner particles is preferably 40 mass % or more and 95 mass % or less, more preferably 50 mass % or more and 90 mass % or less, and still more preferably 60 mass % or more and 85 mass % or less.

The amount of the release agent relative to the entire toner is preferably 1 mass % or more and 20 mass % or less, and more preferably 5 mass % or more and 15 mass % or less.

When the toner contains a colorant, the amount of the colorant relative to the entire toner is preferably 1 mass % or more and 30 mass % or less, and more preferably 3 mass % or more and 15 mass % or less.

The volume average particle size of the toner is preferably 2 μm or more and 10 μm or less, and more preferably 4 μm or more and 8 μm or less. The method for measuring the volume average particle size of the toner is as described below.

The particle size distribution of the toner is measured by using Coulter Multisizer II (available from Beckman Coulter, Inc.) and an electrolyte ISOTON-II (available from Beckman Coulter, Inc.). Before measurement, 0.5 mg or more and 50 mg or less of a test sample is added to 2 ml of a 5 mass % aqueous solution of a surfactant (e.g., sodium alkylbenzene sulfonate) serving as a dispersant. The resulting mixture is added to 100 ml or more and 150 ml or less of the electrolyte. The electrolyte in which the sample is suspended is subjected to a dispersion treatment using an ultrasonic disperser for 1 minute, and the particle size distribution of particles having a particle size in the range of 2 μm or more and 60 μm or less is measured by using Coulter Multisizer II with an aperture having a diameter of 100 μm. The number of sampled particles is 50,000. The particle size distribution is drawn from the smaller particle size, and the particle size at 50% cumulative volume is defined as a volume average particle size D50v.

The average circularity of the toner is preferably 0.94 or more and 1.00 or less, and more preferably 0.95 or more and 0.98 or less.

The average circularity of the toner is (the circumference of a circle having the same area as the projected particle image)/(the circumference of the projected particle image). The average circularity is determined by sampling 3500 particles using a flow particle image analyzer (Sysmex FPIA-3000).

Developer

The toner produced by the production method according to the exemplary embodiment may be used as a one-component developer, or may be mixed with a carrier and used as a two-component developer.

The carrier is not limited, and may be any known carrier. Examples of the carrier include a coated carrier obtained by coating, with resin, the surface of a core material formed of magnetic powder; a magnetic powder-dispersed carrier in which magnetic powder is dispersed in matrix resin; and a resin-impregnated carrier in which porous magnetic powder is impregnated with resin.

The magnetic powder-dispersed carrier or the resin-impregnated carrier may be a carrier having constituent particles as a core material and resin covering the surfaces of the constituent particles.

Examples of the magnetic powder include powders made of magnetic metals, such as iron, nickel, and cobalt; and powders made of magnetic oxides, such as ferrite and magnetite.

Examples of the coating resin and the matrix resin include polyethylene, polypropylene, polystyrene, polyvinyl acetate, polyvinyl alcohol, polyvinyl butyral, polyvinyl chloride, polyvinyl ether, polyvinyl ketone, a vinyl chloride-vinyl acetate copolymer, a styrene-acrylic acid ester copolymer, a straight silicone resin including an organosiloxane bond, and modified products thereof, fluorocarbon resin, polyester, polycarbonate, phenolic resin, and epoxy resin. The coating resin and the matrix resin may contain other additives, such as conductive particles. Examples of the conductive particles include particles made of metals, such as gold, silver, and copper; and particles made of carbon black, titanium oxide, zinc oxide, tin oxide, barium sulfate, aluminum borate, and potassium titanate.

The surface of the core material is coated with resin by, for example, a coating method using a coating layer-forming solution in which a resin for coating and various additives (used as necessary) are dissolved in an appropriate solvent. The solvent is not limited and may be selected in consideration of the type of resin used, coating suitability, and the like.

Specific examples of the resin coating method include an immersion method that involves immersing the core material in the coating layer-forming solution; a spray method that involves spraying the coating layer-forming solution onto the surface of the core material; a fluidized bed method that involves spraying the coating layer-forming solution onto the core material while floating the core material in air flow; and a kneader-coater method that involves mixing the core material of the carrier and the coating layer-forming solution in a kneader-coater, and then removing the solvent.

The mixing ratio (mass ratio) of the toner to the carrier in the two-component developer is preferably from 1:100 to 30:100 (=toner:carrier), and more preferably from 3:100 to 20:100.

EXAMPLES

Exemplary embodiments of the present disclosure will be described below in detail by way of Examples, but exemplary embodiments of the present disclosure are not limited to these Examples.

In the following description, the units "part" and "%" are on a mass basis, unless otherwise specified.

The synthesis, the treatment, and the production are carried out at room temperature (25° C.±3° C.) unless otherwise specified.

Preparation of Particle Dispersion

Preparation of Amorphous Polyester Resin Particle Dispersion (A)

Terephthalic acid: 690 parts
Fumaric acid: 310 parts
Ethylene glycol: 400 parts
1,5-Pentanediol: 450 parts These materials are placed in a reaction vessel equipped with a stirrer, a nitrogen inlet tube, a temperature sensor, and a fractionating column. The mixture is heated to 220° C. over 1 hour under nitrogen gas flow. Titanium tetrabutoxide is added in an amount of 10 parts per 1000 parts of the total of the above materials. While generated water is distilled off, the mixture is heated to 240° C. over 0.5 hours, and the dehydration condensation reaction continues at 240° C. for 1 hour. The reaction product is then cooled. An amorphous polyester resin (A) having a weight-average molecular weight of 96,000 and a glass transition temperature of 59° C. is produced accordingly.

In a vessel equipped with a temperature controlling unit and a nitrogen purging unit, 550 parts of ethyl acetate and 250 parts of 2-butanol are placed to form a solvent mixture, and 1000 parts of the amorphous polyester resin (A) is then gradually added and dissolved in the solvent mixture. To the obtained solution, a 10% aqueous ammonia solution (in an amount corresponding to three times the acid value of the resin in terms of molar ratio) is added, and the mixture is stirred for 30 minutes. Next, the reaction container is purged with dry nitrogen and held at 40° C. To the mixture, 4000 parts of ion exchange water is added dropwise under stirring to form an emulsion. After completion of dropwise addition, the emulsion is returned to 25° C., and the solvent is removed under reduced pressure to provide a resin particle dispersion in which resin particles having a volume average particle size of 160 nm are dispersed. The solids content of the resin particle dispersion is adjusted to 20% by addition of ion exchange water to provide an amorphous polyester resin particle dispersion (A).

Preparation of Amorphous Polyester Resin Particle Dispersion (B)

Terephthalic acid: 690 parts
Trimellitic acid: 310 parts
Ethylene glycol: 400 parts
1,5-Pentanediol: 450 parts These materials are placed in a flask equipped with a stirrer, a nitrogen inlet tube, a temperature sensor, and a fractionating column. The mixture is heated to 220° C. over 1 hour under nitrogen gas flow. Titanium tetrabutoxide is added in an amount of 10 parts per 1000 parts of the total of the above materials. While generated water is distilled off, the mixture is heated to 240° C. over 0.5 hours, and the dehydration condensation reaction continues at 240° C. for 1 hour. The reaction product is then cooled. An amorphous polyester resin (B) having a weight-average molecular weight of 127000 and a glass transition temperature of 59° C. is produced accordingly.

In a vessel equipped with a temperature controlling unit and a nitrogen purging unit, 700 parts of ethyl acetate and 500 parts of 2-butanol are placed to form a solvent mixture, and 1000 parts of the amorphous polyester resin (B) is then gradually added and dissolved in the solvent mixture. To the obtained solution, a 10% aqueous ammonia solution (in an amount corresponding to four times the acid value of the resin in terms of molar ratio) is added, and the mixture is stirred for 30 minutes. Next, the reaction container is purged with dry nitrogen and held at 40° C. To the mixture, 4000 parts of ion exchange water is added dropwise under stirring to form an emulsion. After completion of dropwise addition, the emulsion is returned to 25° C., and the solvent is removed under reduced pressure to provide a resin particle dispersion in which resin particles having a volume average particle size of 80 nm are dispersed. The solids content of the resin particle dispersion is adjusted to 20% by addition of ion exchange water to provide an amorphous polyester resin particle dispersion (B).

Preparation of Crystalline Polyester Resin Particle Dispersion (C)

1,10-decanedicarboxylic acid: 2600 parts
1,6-Hexanediol: 1670 parts
Dibutyltin oxide (catalyst): 3 parts These materials are placed in a heat-dried reaction vessel, and the air in the reaction vessel is replaced with nitrogen gas to make an inert environment. The mixture is refluxed at 180° C. for 5 hours by machinery stirring. Next, the mixture is then gradually heated to 230° C. under reduced pressure and stirred for 2 hours. The mixture is then air-cooled to terminate the reaction when the mixture becomes viscous. A crystalline polyester resin having a weight-average molecular weight of 12600 and a melting temperature of 73° C. is produced accordingly.

A mixture of 900 parts of the crystalline polyester resin, 18 parts of an anionic surfactant (TaycaPower available from Tayca Corporation), and 2100 parts of ion exchange water is heated to 120° C. The mixture is formed into a dispersion by using a homogenizer (ULTRA-TURRAX T50 available from IKA) and then subjected to a dispersion treatment with a pressure discharge Gaulin homogenizer for 1 hour to form a resin particle dispersion in which resin particles having a volume average particle size of 160 nm are dispersed. The solids content of the resin particle dispersion is adjusted to 20% by addition of ion exchange water to provide a crystalline polyester resin particle dispersion (C).

Preparation of Styrene Acrylic Resin Particle Dispersion (S)

Styrene: 3750 parts
n-Butyl acrylate: 250 parts
Acrylic acid: 20 parts
Dodecanethiol: 240 parts
Carbon tetrabromide: 40 parts An aqueous surfactant solution is prepared by dissolving 60 parts of a nonionic surfactant (Nonipol 400 available from Sanyo Chemical Industries, Ltd.) and 100 parts of an anionic surfactant (TaycaPower available from Tayca Corporation) in 5500 parts of ion exchange water. A mixture formed by mixing and dissolving the above polymer materials is dispersed and emulsified in the aqueous surfactant solution. Next, an aqueous solution formed by dissolving 40 parts of ammonium persulfate in 500 parts of ion exchange water is added over 20 minutes under continuous stirring in the reaction vessel. Next, the reaction vessel is purged with nitrogen and then heated in an oil bath under continuous stirring in the reaction vessel until the contents reach 70° C. The temperature is maintained at 70° C. for 5 hours to continue emulsion polymerization. A resin particle dispersion in which resin particles having a volume average particle size of 160 nm are dispersed is produced accordingly. The solids content of the resin particle dispersion is adjusted to 20% by addition of ion exchange water to provide a styrene acrylic resin particle dispersion (S).

Preparation of Release Agent Particle Dispersion (W)

Paraffin wax (FNP-92 available from Nippon Seiro Co., Ltd., melting temperature 92° C.): 1000 parts
Anionic surfactant (TaycaPower available from Tayca Corporation): 10 parts
Ion exchange water: 3500 parts These materials are mixed and heated to 100° C. The mixture is formed into a dispersion by using a homogenizer (ULTRA-TURRAX T50 available from IKA) and then subjected to a dispersion treatment with a pressure discharge Gaulin homogenizer to form a release agent particle dispersion in which release agent particles having a volume average particle size of 220 nm are dispersed. The solids content of the release agent particle dispersion is adjusted to 20% by addition of ion exchange water to form a release agent particle dispersion (W).

Preparation of Colorant Particle Dispersion (K)

Carbon black (Regal 330 available from Cabot Corporation): 500 parts
Anionic surfactant (Neogen RK available from DKS Co. Ltd.): 50 parts
Ion exchange water: 1930 parts These materials are mixed and subjected to a dispersion treatment by using Ultimizer (available from Sugino Machine Limited) at 240 MPa for 10 minutes to form a colorant particle dispersion (K) with 20% solids content.

Example 1

Preparation of Reaction Vessel

A jacketed stirring vessel is provided. The bottom of the stirring vessel is connected to a disperser (Cavitron CD 1010 available from Pacific Machinery & Engineering Co., Ltd) through a conduit and a circulation pump, and a conduit from the outlet of the disperser is dipped in the liquid in the stirring vessel from above, whereby a circulation reaction vessel is made. The conduit that connects the bottom of the stirring vessel to the disperser is provided with a material feed port.

First Aggregation Step

Ion exchange water: 5000 parts
Amorphous polyester resin particle dispersion (A): 2630 parts
Amorphous polyester resin particle dispersion (B): 2630 parts
Crystalline polyester resin particle dispersion (C): 1500 parts
Styrene acrylic resin particle dispersion (S): 750 parts
Release agent particle dispersion (W): 1500 parts
Colorant particle dispersion (K): 1500 parts These materials are placed in the circulation reaction vessel, and the pH is adjusted to 3.8 by addition of 0.1N nitric acid.

An aqueous solution of aluminum sulfate is prepared by dissolving 15 parts of aluminum sulfate in 1000 parts of ion exchange water. The aqueous solution of aluminum sulfate is added from the feed port while the contents are stirred and dispersed by circulation in the circulation reaction vessel. Next, the contents are stirred and dispersed by circulation for 10 minutes with the contents maintained at 30° C.

Next, the disperser is stopped, the bottom valve on the bottom of the stirring vessel is closed, and 3000 parts of ion exchange water is added from the feed port. Ion exchange water is introduced to the stirring vessel through the disperser and the conduit and mixed with the dispersion under stirring.

Next, the contents are heated to 45° C. with the jacket under continuous stirring and held until the volume average particle size of the aggregated particles reaches 4.0 μm.

Second Aggregation Step

A mixture of 2250 parts of the amorphous polyester resin particle dispersion (A) and 2250 parts of the amorphous polyester resin particle dispersion (B) is added to a stirring vessel and held for 30 minutes to form a dispersion containing second aggregated particles.

Aggregation Termination Step

To the dispersion containing the second aggregated particles, 200 parts of ethylenediaminetetraacetic acid (EDTA) is added. Next, the pH is adjusted and the stirring power per unit volume is changed in three steps as described below.

(1) The pH is adjusted to 5 by addition of a 1N aqueous solution of sodium hydroxide, and the stirring power per unit volume is reduced from 3.2 kW/$m^3$ to 2.8 kW/$m^3$ and held for 5 minutes.
(2) Next, the pH is adjusted to 7 by addition of a 1N aqueous solution of sodium hydroxide, and the stirring power per unit volume is reduced from 2.8 kW/$m^3$ to 1.4 kW/$m^3$ and held for 3 minutes.
(3) Next, the pH is adjusted to 9 by addition of a 1N aqueous solution of sodium hydroxide, and the stirring power per unit volume is reduced from 1.4 kW/$m^3$ to 0.3 kW/$m^3$ and held for 5 minutes.

Coalescence Step

Under continuous stirring in the stirring vessel, the stirring vessel is heated to 85° C. at a heating rate of 0.5° C./min, held at 85° C. for three hours, and then cooled to 30° C. at 15° C./min (first cooling). Next, the stirring vessel is heated to 55° C. at a heating rate of 0.2° C./min (reheating), held for 30 minutes, and then cooled to 30° C. at 0.5° C./min (second cooling). Next, the solids are filtered, washed with ion exchange water, and dried to form toner particles (1) having a volume average particle size of 5.0 μm.

Addition of External Additives

A mixture of 100 parts of the toner particles (1) and 1.5 parts of hydrophobic silica (RY50 available from Nippon Aerosil Co., Ltd.) is mixed by using a sample mill at a rotational speed of 10,000 rpm for 30 seconds. The mixture is sifted through a vibrating screen with a mesh size 45 μm to provide a toner (1). The toner (1) has a volume average particle size of 5.0 μm.

Preparation of Carrier

After 500 parts of spherical magnetite powder particles (volume average particle size 0.55 μm) are stirred with a Henschel mixer, 5 parts of titanate coupling agent is added, and the mixture is heated to 100° C. and stirred for 30 minutes. Next, 6.25 parts of phenol, 9.25 parts of 35% formalin, 500 parts of titanate coupling agent-treated magnetite particles, 6.25 parts of 25% ammonia water, and 425 parts of water are placed and stirred in a four-necked flask. The mixture is caused to react at 85° C. for 120 minutes under stirring. Next, the mixture is cooled to 25° C., and 500 parts of water is added. The supernatant is then removed, and the precipitate is washed with water. The water-washed precipitate is dried by heating under reduced pressure to provide a carrier (CA) having an average particle size of 35 μm.

Preparation of Developer

The toner (CA) and the carrier (CA) are placed in a V-blender at a ratio of toner (1):carrier (CA)=5:95 (mass ratio) and stirred for 20 minutes to provide a developer (1).

Examples 2 to 6 and Comparative Examples 1 to 2

Toner particles are produced in the same manner as in Example 1 except that the conditions for producing the toner particles are changed to the specifications shown in Table 1. Next, in the same manner as in Example 1, external additives are added to the toner particles, and the resulting toner particles are mixed with the carrier to provide a developer.

Performance Evaluation

The toner particles before addition of external additives are used as a sample and subjected to the following evaluation.

Particle Size Distribution Index

The particle size distribution of the toner particles is determined by the method for measuring the volume average particle size of the toner described above. The volume-based cumulative distribution is drawn from the smaller particle size, and the particle size D16v at 16% cumulative volume and the particle size D50v at 50% cumulative volume are determined. The particle size distribution index on the smaller particle size side is calculated by dividing D50v by D16v. The results are shown in Table 1. The value of D50v/D16v may be close to 1.

Percentage of Fine Particles

Toner particles having a particle size of 3 μm or less are defined as fine particles, and the percentage of the number (number %) of toner particles having a particle size of 3 μm or more in the particle size distribution obtained above is determined. The results are shown in Table 1.

Percentage of Coarse Particles

Toner particles having a particle size of 15 μm or more are defined as coarse particles, and the percentage of the number (number %) of toner particles having a particle size of 15 μm or more in the particle size distribution obtained above is determined. The results are shown in Table 1.

TABLE 1

| | pH Adjustment | | | Changes in Stirring Power | | | | D50v | D50v/D16v | Percentage of Fine Particles | Percentage of Coarse Particles |
|---|---|---|---|---|---|---|---|---|---|---|---|
| | — | — | — | kW/m$^3$ | kW/m$^3$ | kW/m$^3$ | kW/m$^3$ | μm | — | number % | volume % |
| Comparative Example 1 | 5 | 7 | 9 | 3.1 | 3.1 | 3.1 | 3.1 | 5.1 | 1.35 | 6.4 | 0.5 |
| Comparative Example 2 | 5 | 7 | 9 | 2.2 | 2.2 | 2.2 | 2.2 | 5.8 | 1.29 | 3.9 | 2.3 |
| Example 1 | 5 | 7 | 9 | 3.2 | 2.8 | 1.4 | 0.3 | 5.0 | 1.22 | 1.2 | 0.2 |
| Example 2 | 5 | 7 | 9 | 3.1 | 1.8 | 0.2 | 0.1 | 5.6 | 1.26 | 1.6 | 0.4 |
| Example 3 | 5 | 7 | 9 | 2.2 | 1.6 | 0.6 | 0.5 | 5.8 | 1.25 | 1.8 | 0.6 |
| Example 4 | 5 | 7 | 9 | 4.0 | 2.8 | 1.4 | 0.3 | 5.5 | 1.29 | 3.2 | 0.7 |
| Example 5 | 5 | 7 | 9 | 3.2 | 2.8 | 1.4 | 0.05 | 5.3 | 1.23 | 2.6 | 1.2 |
| Example 6 | 5 | 7 | 10 | 3.2 | 2.8 | 1.4 | 0.3 | 5.1 | 1.27 | 3.9 | 0.5 |

The foregoing description of the exemplary embodiments of the present disclosure has been provided for the purposes of illustration and description. It is not intended to be exhaustive or to limit the disclosure to the precise forms disclosed. Obviously, many modifications and variations will be apparent to practitioners skilled in the art. The embodiments were chosen and described in order to best explain the principles of the disclosure and its practical applications, thereby enabling others skilled in the art to understand the disclosure for various embodiments and with the various modifications as are suited to the particular use contemplated. It is intended that the scope of the disclosure be defined by the following claims and their equivalents.

What is claimed is:

1. A method for producing a toner for electrostatic charge image development, the method comprising:

aggregating binder resin particles in a dispersion containing the binder resin particles to form aggregated particles;

after forming the aggregated particles, terminating growth of the aggregated particles by adding an alkaline aqueous solution to a dispersion containing the aggregated particles to increase a pH of the dispersion containing the aggregated particles; and after terminating the growth of the aggregated particles, fusing and coalescing the aggregated particles into toner particles by heating the dispersion containing the aggregated particles, wherein terminating the growth of the aggregated particles includes, while stirring the dispersion containing the aggregated particles, stepwise reducing a stirring power per unit volume, and wherein terminating the growth of the aggregated particles includes:

stepwise adding the alkaline aqueous solution to stepwise increase the pH of the dispersion containing the aggregated particles; and stepwise reducing the stirring power per unit volume as the pH of the dispersion containing the aggregated particles increases stepwise, wherein, after each reduction of the stirring power per unit volume and addition of the alkaline aqueous solution, the stirring power per unit volume is maintained for a predetermined period of time.

2. The method for producing a toner for electrostatic charge image development according to claim 1, wherein the stirring power per unit volume in terminating the growth of the aggregated particles is not less than 0.1 $kW/m^3$.

3. The method for producing a toner for electrostatic charge image development according to claim 1, wherein the stirring power per unit volume in terminating the growth of the aggregated particles is not more than 3.5 $kW/m^3$.

4. The method for producing a toner for electrostatic charge image development according to claim 2, wherein the stirring power per unit volume in terminating the growth of the aggregated particles is not more than 3.5 $kW/m^3$.

5. The method for producing a toner for electrostatic charge image development according to claim 1, wherein the pH of the dispersion containing the aggregated particles in terminating the growth of the aggregated particles is not higher than 9.

6. The method for producing a toner for electrostatic charge image development according to claim 2, wherein the pH of the dispersion containing the aggregated particles in terminating the growth of the aggregated particles is not higher than 9.

7. The method for producing a toner for electrostatic charge image development according to claim 3, wherein the pH of the dispersion containing the aggregated particles in terminating the growth of the aggregated particles is not higher than 9.

8. The method for producing a toner for electrostatic charge image development according to claim 4, wherein the pH of the dispersion containing the aggregated particles in terminating the growth of the aggregated particles is not higher than 9.

9. The method for producing a toner for electrostatic charge image development according to claim 1, wherein the alkaline aqueous solution contains at least one selected from the group consisting of aqueous solutions of alkali metal hydroxides, aqueous solutions of alkaline earth metal hydroxides, and aqueous solutions of chelators for chelating an aggregating agent.

10. The method for producing a toner for electrostatic charge image development according to claim 1, wherein the dispersion containing the binder resin particles further contains release agent particles, and aggregating the binder resin particles involves aggregating the release agent particles together with the binder resin particles to form the aggregated particles.

11. The method for producing a toner for electrostatic charge image development according to claim 1, wherein the dispersion containing the binder resin particles further contains colorant particles, and aggregating the binder resin particles involves aggregating the colorant particles together with the binder resin particles to form the aggregated particles.

12. The method for producing a toner for electrostatic charge image development according to claim 1, the method further comprising:

before terminating the growth of the aggregated particles, mixing the dispersion containing the aggregated particles and a dispersion containing shell layer-forming resin particles that will form a shell layer, and aggregating the shell layer-forming resin particles on the surfaces of the aggregated particles to form second aggregated particles, wherein terminating the growth of the aggregated particles involves terminating growth of the second aggregated particles by adding an alkaline aqueous solution to a dispersion containing the second aggregated particles to increase a pH of the dispersion containing the second aggregated particles, fusing and coalescing the aggregated particles involves fusing and coalescing the second aggregated particles into toner particles by heating the dispersion containing the second aggregated particles, and terminating the growth of the aggregated particles includes, while stirring the dispersion containing the second aggregated particles, stepwise or continuously reducing a stirring power per unit volume.

13. A toner for electrostatic charge image development produced by the method for producing a toner for electrostatic charge image development according to claim 1.

14. An electrostatic charge image developer comprising a toner for electrostatic charge image development produced by the method for producing a toner for electrostatic charge image development according to claim 1.

15. The method for producing a toner for electrostatic charge image development according to claim 1, wherein the stepwise reduction of the stirring power per unit volume after addition of the alkaline aqueous solution is performed three times.

16. The method for producing a toner for electrostatic charge image development according to claim 1, wherein the stepwise reduction of the stirring power per unit volume after addition of the alkaline aqueous solution is performed four times.

17. The method for producing a toner for electrostatic charge image development according to claim 1, wherein the stepwise reduction of the stirring power per unit volume after addition of the alkaline aqueous solution is performed five times.

* * * * *